F. H. DANIELS.
SCREW CUTTING LATHE.
APPLICATION FILED JULY 12, 1919.
1,371,606.
Patented Mar. 15, 1921.
2 SHEETS—SHEET 1.
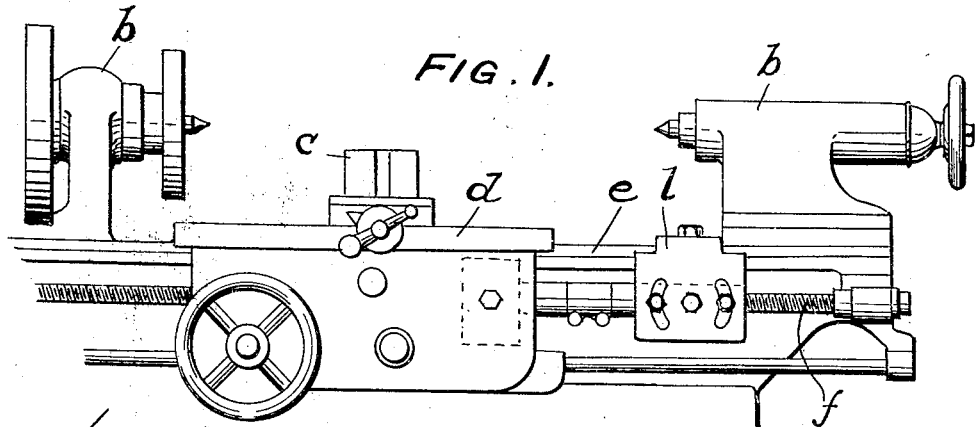
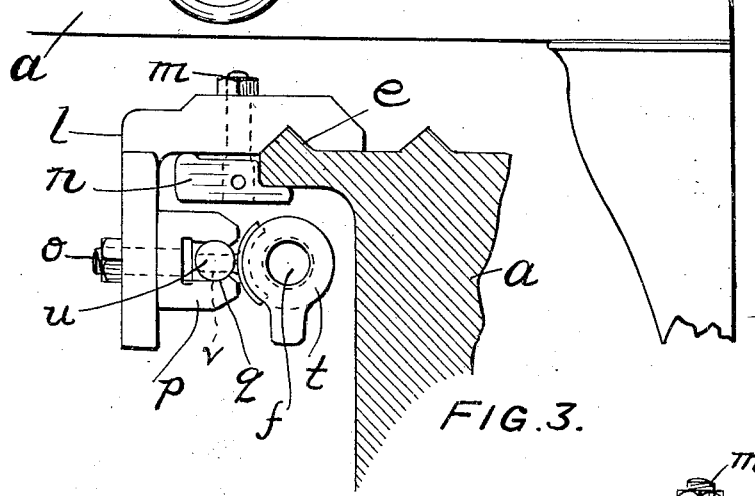
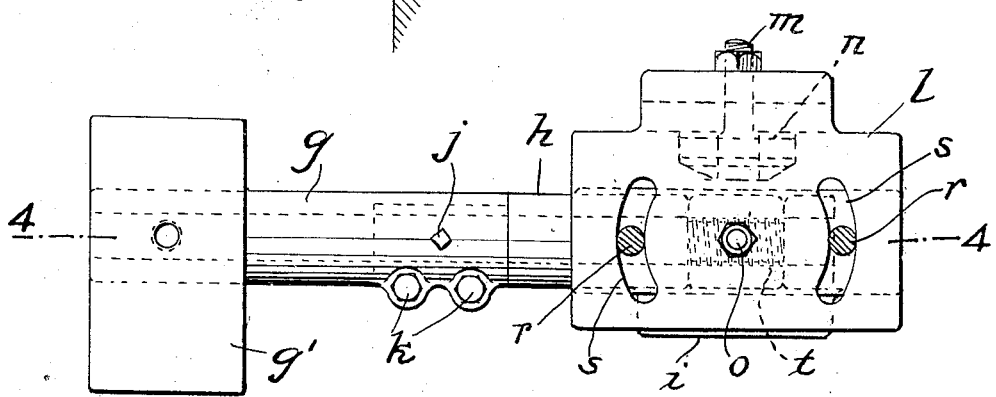
WITNESS:
Rob't R. Kitchel.
INVENTOR
Frank H. Daniels
BY
Frank S. Busser
ATTORNEY.

F. H. DANIELS.
SCREW CUTTING LATHE.
APPLICATION FILED JULY 12, 1919.

1,371,606.

Patented Mar. 15, 1921.

WITNESS:
Robt R Kitchel

INVENTOR
Frank H. Daniels
BY
Frank S. Busser
ATTORNEY.

UNITED STATES PATENT OFFICE.

FRANK H. DANIELS, OF PHILADELPHIA, PENNSYLVANIA, ASSIGNOR TO THE JOHN M. ROGERS WORKS, INC., OF GLOUCESTER CITY, NEW JERSEY, A CORPORATION OF NEW JERSEY.

SCREW-CUTTING LATHE.

1,371,606.      Specification of Letters Patent.      Patented Mar. 15, 1921.

Application filed July 12, 1919. Serial No. 310,462.

*To all whom it may concern:*

Be it known that I, FRANK H. DANIELS, a citizen of the United States, residing at Philadelphia, county of Philadelphia, and State of Pennsylvania, have invented a new and useful Improvement in Screw-Cutting Lathes, of which the following is a full, clear, and exact description, reference being had to the accompanying drawings, which form a part of this specification.

My invention relates to an attachment for lathes, thread grinders, or thread milling machines, in connection with their use in cutting threads.

I have found that in cutting threads where great accuracy is essential, as in screws used in the construction of delicate instruments and gages, the present methods are deficient because of the presence of lost motion in the feed screw, gears, etc., which results in variations in the pitch of the screw.

The object of my invention is to provide an attachment for lathes, which will permit threads to be cut with the greatest accuracy and which will permit of the production of screws with uniformly accurate pitch.

I will now describe my invention in detail in connection with the accompanying drawings in which like symbols refer to like parts in the various figures.

Figure 1 is a side elevation of a lathe with the device involving my invention attached.

Fig. 2 is a side elevation of the device involving my invention.

Fig. 3 is an end view of the subject of Fig. 2.

Upon the bed $a$ are mounted the head and tail stock centers $b$. A tool support $c$ is mounted on a carriage $d$ adapted to travel horizontally on the ways $e$, in the bed, under the influence of the right hand threaded feed screw $f$. The usual power driven speed pulleys and various gears are provided to drive the work and the feed screw, but I do not show them, as they conform to the usual design.

A sleeve $g$ provided with a flange $g'$ at one end is passed over the feed screw and bolted to the carriage $c$, the flange $g'$ taking the place of the usual feed nut. A second sleeve $h$ having a yoke $i$ at one end is passed over the feed screw and fitted into the end of sleeve $g$ and positioned by a screw $j$. The two sleeves are fastened together by means of bolts $k$. A casing $l$ is clamped to the bed $a$ adjacent to the yoke by a bolt $m$ and lug $n$.

Figure 4:
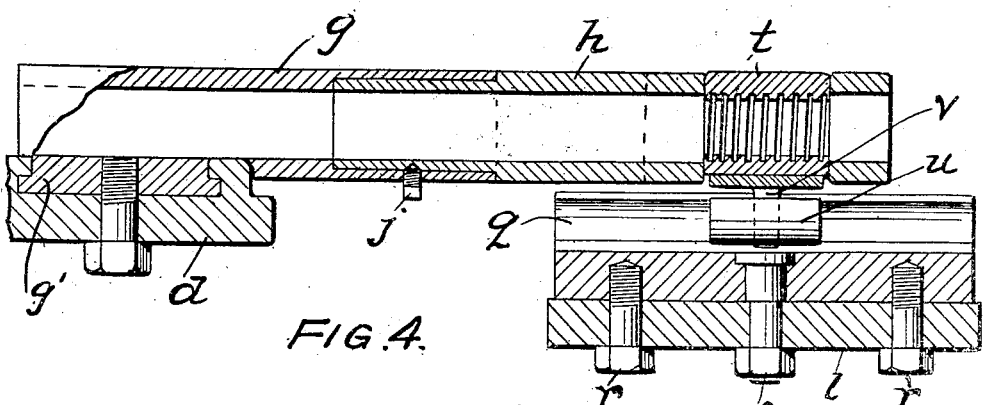
Fig. 4 is a horizontal section along line 4—4 Fig. 2.
Figure 5:
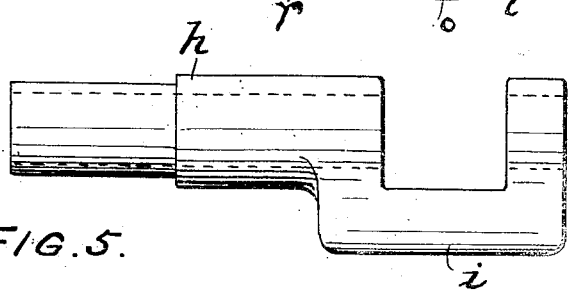
Figs. 5, 6 and 7 are views of details of the device involving my invention.
Figure 6:
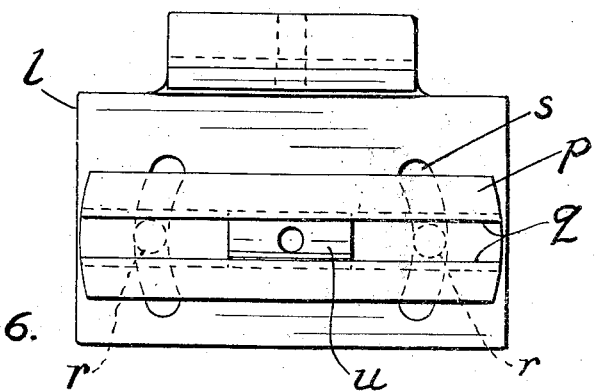
Figure 7:
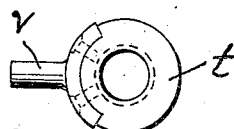

Within and pivoted on bolt $o$ to the casing is a block $p$ in which is formed a cylindrical guideway $q$. Set screws $r$ extend through slots $s$ in the casing and engage the block. A nut $t$, in engagement with the feed screw and embraced by yoke $h$ is connected to a short slide $u$ adapted to travel in the guideway $q$ by means of a pin $v$ which may be integral, with the nut or connected to it as shown in the drawing Fig. 7.

It will be noted that the pin $v$ permits the block $u$ to turn about its own axis and the nut $t$ to move toward and away from the block, as is necessitated by its movement in guideway $q$.

In operation, if it is found that the lathe is not cutting a screw with an accurate pitch, it is first determined whether the error is in more than exactly the required number of turns to the unit, or less. Then the set screws $r$ are loosened and the block $p$ turned so that one end is slightly higher than the other. If the error is minus, the inner end is raised, and if plus the outer end is raised. The set screws $r$ are tightened up to clamp the block in position.

If the error is minus, the inner end of the block is raised, putting the guideway $q$ on a slant. As the feed screw turns, the nut travels forwardly along the screw and causes the slide $u$ to travel along the guideway. Since the guideway presents an upward incline, in the direction of travel of the slide, as the slide travels up the incline it turns the nut on the feed screw in a direction contrary to the thread of the screw and causes the carriage to travel faster relatively to the speed of rotation of the screw than the lathe is geared up for.

The tool is made to travel by the nut, through its bearing against yoke $i$ and the sleeves $g$ and $h$, which, as described, are connected together, sleeve $g$ being connected to the carriage.

As the nut travels faster than if it had no turning movement, it is obvious that the tool will travel proportionately faster and the minus error can be made to disappear.

If the error is plus, the outer end of the block is raised and the guideway $q$ will present a downward incline in the direction of travel of the slide and as the slide descends it will turn the nut with the screw, thus decreasing the rate of travel of the tool relatively to the speed of rotation of the screw and eradicating a plus error.

When the device is adjusted, a cut is made and carefully gaged. Any error found can be corrected by manipulation of the block and the subsequent cuts necessary to complete the screw will remove the error from the finished article.

While I have described the invention as applied to a lathe, it is obvious that it is equally applicable to thread grinders or thread milling machines. The tool support will, of course be provided with any tool suitable for the machine to which the invention is applied.

Having now fully described my invention, what I claim and desire to protect by Letters Patent is:

1. A screw cutting lathe comprising a frame, a carriage adapted to be moved longitudinally on the frame, a lead screw, a nut on the lead screw connected to the carriage for moving the carriage, an auxiliary frame adjustably connected to the main frame, a plate adjustably mounted on the auxiliary frame having a cam-way therein, means for locking the plate in its adjusted position, a block slidable in said cam-way, and a pivotal connection between said block and the nut.

2. A screw cutting lathe comprising a frame, a carriage adapted to be moved longitudinally on the frame, a lead screw, a nut on the lead screw connected to the carriage for moving the carriage, an auxiliary frame adjustably connected to the main frame, a plate adjustably connected to the auxiliary frame and having a longitudinally extending cam-way therein, said cam-way being of circular form, means for locking the plate in its adjusted position to the auxiliary frame, a cylindrical block in the cam-way arranged to slide and rotate therein, and a pivotal connection between the block and the nut.

3. A screw cutting lathe comprising a frame, ways on the frame, a carriage mounted to slide on the ways, a lead screw, a nut on the lead screw connected to the carriage to move the carriage, an auxiliary frame, said auxiliary frame having a recess for the reception of one of the ways, a clamp for adjustably securing the auxiliary frame on said way, a plate adjustably mounted on the auxiliary frame having a cam-way therein, means for locking the plate in its adjusted position, a slide mounted in the cam-way, and a driving connection between the nut and the slide for moving the slide along the cam-way and for rotating the nut about the lead screw.

4. A screw cutting attachment for lathes comprising a sleeve arranged to surround the lead screw and adapted to be attached to a lathe carriage, a lead screw nut associated with the sleeve, a cam plate associated with the nut, a supporting frame on which the cam plate is adjustably mounted, means for adjustably securing the cam plate to the frame, and a clamp for adjustably clamping the supporting frame to the ways of a lathe.

In testimony of which invention I have hereunto set my hand, at Gloucester City, N. J., on this 10th day of July, 1919.

FRANK H. DANIELS.